J. A. SMITH.
SHOE AND GLOVE BUTTONER.

No. 172,893. Patented Feb. 1, 1876.

UNITED STATES PATENT OFFICE.

JOSEPH A. SMITH, OF DEEP RIVER, CONNECTICUT.

IMPROVEMENT IN SHOE AND GLOVE BUTTONERS.

Specification forming part of Letters Patent No. 172,893, dated February 1, 1876; application filed January 4, 1876.

*To all whom it may concern:*

Be it known that I, JOSEPH A. SMITH, of Deep River, in the county of Middlesex and State of Connecticut, have invented a new Improvement in Button-Hooks; and I do hereby declare the following, when taken in connection with the accompanying drawings and the letters of reference marked thereon, to be a full, clear, and exact description of the same, and which said drawings constitute part of this specification, and represent, in—

Figure 1:
Figure 2:
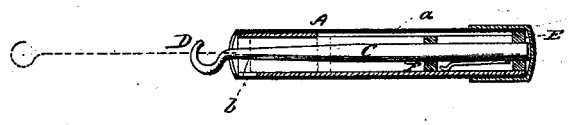
Figure 3:
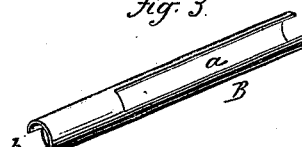
Figure 4:
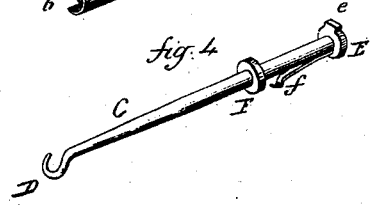

Figure 1, a side view; Fig. 2, longitudinal central section; Fig. 3, perspective view of the internal barrel; Fig. 4, perspective view of the hook and guides.

This invention relates to an improvement in the article known to the trade as "button-hooks"—that is, an instrument to facilitate the buttoning of shoes, gloves, and like purposes, the object of the invention being to construct the hook so that it may be contracted in extent when not in use, and at the same time be protected; and it consists in a cylinder, within which the hook-spindle is arranged, and guided so as move freely out and in, combined with a spring-latch to hold the hook when drawn out.

A is a case, of metal or other suitable material, within which is a lining, B, fitting close within, and practically making a part of the outer case. Longitudinally in this lining is a slot, a, and at the forward end a notch, b. C is the hook-spindle, terminating in the hook D, substantially like the common button-hook. On the other end of the spindle is a head, E, fitting the internal lining, and so as to be moved freely therein. On this head E is a radial projection, e, corresponding to and so as to run in the groove a, thus serving as a guide to prevent the hook from turning. As an additional support for the hook a second head, F, is arranged on the spindle forward of the principal head E; but this is not essential, as the head E may be made of sufficient length to give this support.

In connection with the head, or with the spindle, is a spring-latch, f, arranged and operating so that when the hook is drawn out, as in broken lines, Fig. 2, the end of the latch will fall into the notch b, and there hold the hook in condition for use, but so that when force is applied to press the hook back into the case, the latch will pass from the notch to return with the spindle.

While the internal lining is preferred, as being an economical construction, it may be dispensed with by forming a groove or depression in the case to guide the spindle, and a notch or shoulder for the latch. I therefore do not confine myself to the use of the internal lining.

I claim—

The combination of the case A, constructed with a longitudinal guide, the hook-spindle C, provided with the head to work within the cylinder and in the said guide, and a spring-latch to hold the said hook when drawn out, substantially as described.

JOSEPH A. SMITH.

Witnesses:
C. R. MARVIN,
JOHN W. MARVIN.